Jan. 4, 1949.   S. B. INGRAM   2,458,000
FEEDBACK AMPLIFIER OR OSCILLATOR
Filed Nov. 6, 1943   2 Sheets-Sheet 1
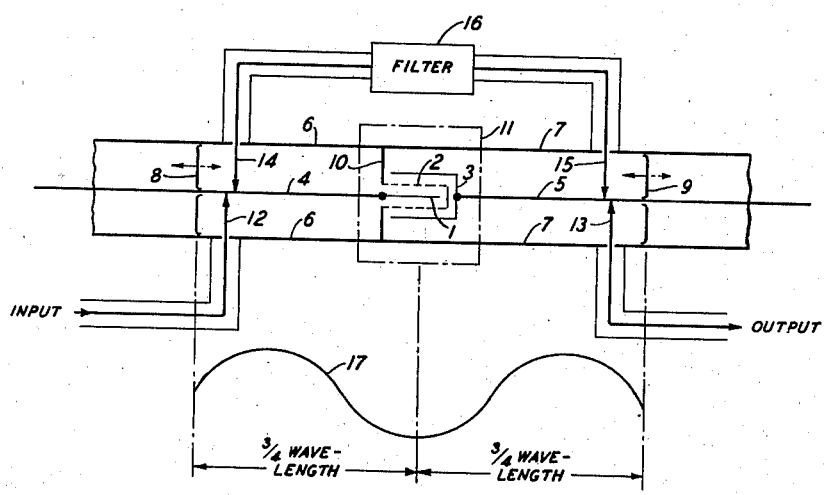
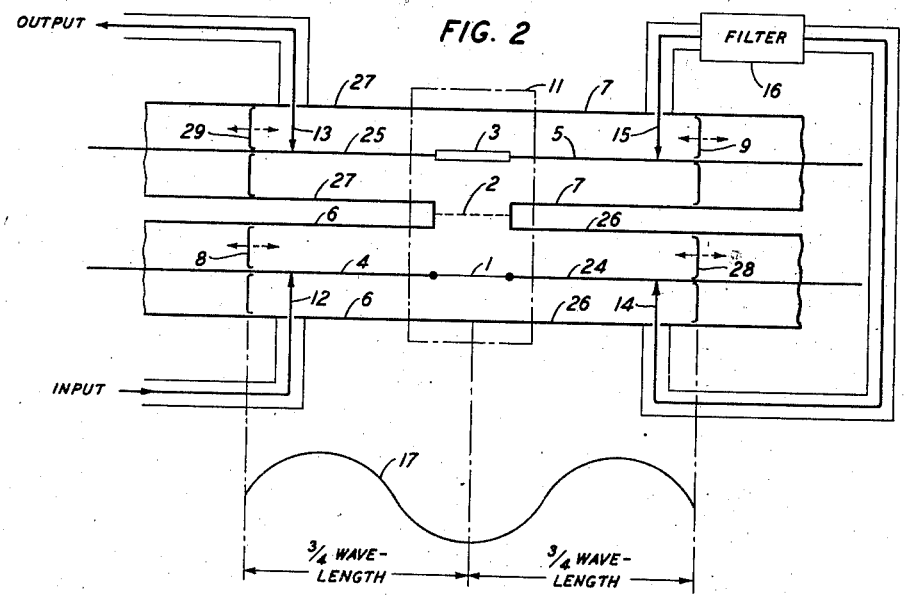
INVENTOR
S. B. INGRAM
BY
E. V. Griggs
ATTORNEY Jan. 4, 1949.   S. B. INGRAM   2,458,000
FEEDBACK AMPLIFIER OR OSCILLATOR
Filed Nov. 6, 1943   2 Sheets-Sheet 2
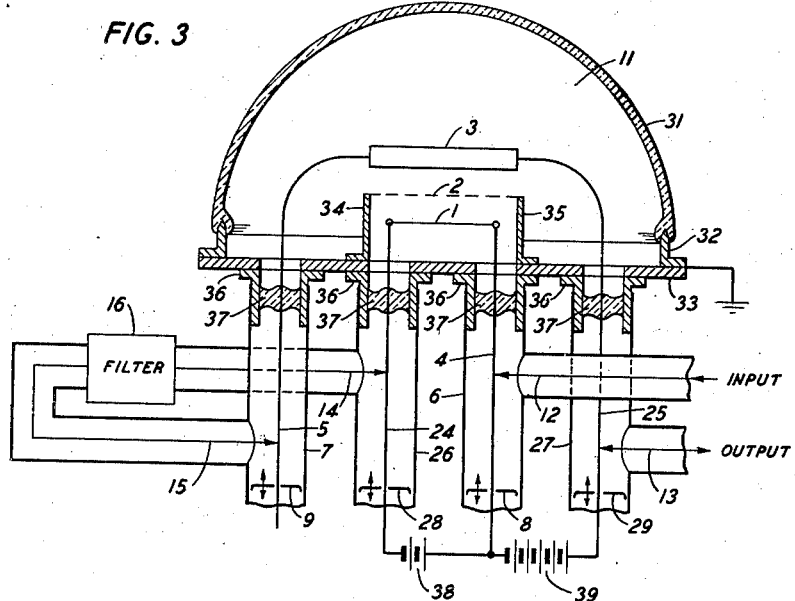
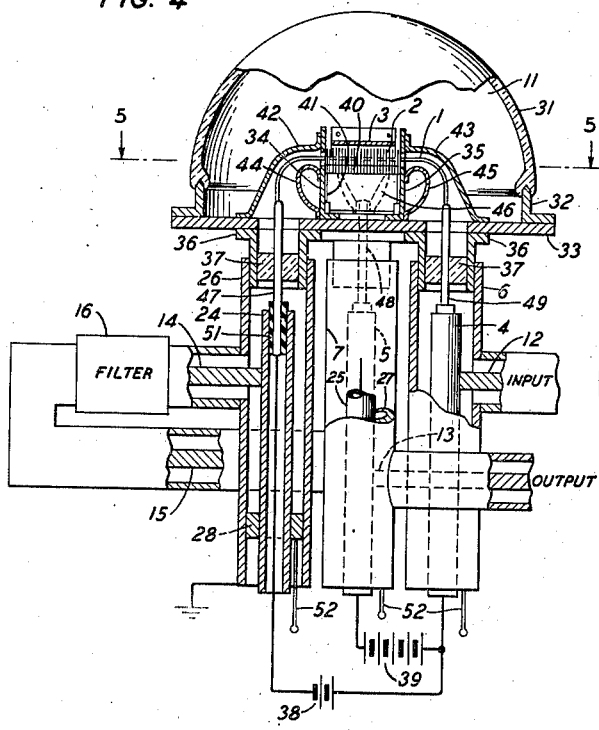
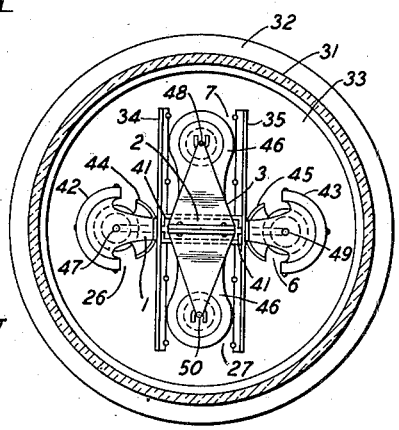
INVENTOR
S. B. INGRAM
BY
E. V. Griggs
ATTORNEY Patented Jan. 4, 1949

2,458,000

UNITED STATES PATENT OFFICE 2,458,000

FEEDBACK AMPLIFIER OR OSCILLATOR

Sydney B. Ingram, Fairlawn, N. J., assignor to Bell Telephone Laboratories, Incorporated, New York, N. Y., a corporation of New York Application November 6, 1943, Serial No. 509,192

6 Claims. (Cl. 179—171)

This invention relates to electronic devices for the production or amplification of ultra-high frequency energy and particularly to such devices where the wavelength of the high frequency energy is comparable to the dimensions of the electron tube and the associated leads.

The principal object of the invention is to permit the use in such a device of circuit elements which are physically advantageous while avoiding the effect of the tendency of such elements to cause the circuit to produce oscillations at an undesired frequency.

Another object is to provide an efficient and controllable feedback type of device suitable for either the amplification or production of ultra-high frequency energy.

In the use of electron tubes at very high frequencies it is sometimes found that the tube elements themselves constitute such a large portion of the electrical circuit in which the tube is to operate that there is little opportunity to construct suitably the portion of the circuit external to the tube and considerable difficulty is experienced in adjusting to and operating at the desired frequency. In efforts to overcome such difficulties, tubes have been designed with electrodes having very small dimensions. Also, tubes and external circuits have been arranged so that the tube electrodes are effectively smooth continuations of external tuned circuits which are in the form of lecher wires or coaxial lines. A common way of operating such a circuit is to short-circuit the lines a quarter wavelength away from the tube electrodes so that antinodes of voltage appear at the electrodes. At very high frequencies the quarter wave points which it is desired to short-circuit may be very close to the tube leads (or in an extreme case even within the tube) so that they may be difficult to use or actually inaccessible. Under such a condition (as well as in other circumstances) the expedient is followed of extending the lines more than one quarter wavelength from the tube and short-circuiting them at distances an odd number of quarter wavelengths from the tube electrodes. With such an arrangement the voltage antinodes occur at the tube electrodes as with one-quarter wavelength lines while the short-circuiting positions are clear of the tube and readily accessible. A disadvantage of such an arrangement is that oscillations may be produced at a frequency lower than the desired operating frequency on account of a mode of oscillations such, for instance, that the lines are a quarter wave long at the lower frequency rather than several quarter waves long at the higher frequency. The prevention of such undesired lower frequency oscillation or regeneration by preventing the causative feedback is the principal object of this invention. This is accomplished by the use of a filter in the feedback circuit to prevent feedback at the undesired lower frequency. The nature of the invention will be more fully understood from the following detailed description and the accompanying drawings, of which:

Fig. 1 is a diagrammatic sketch of the invention as applied to a tube using distributed circuits, each extending in one direction from the tube electrodes;

Fig. 2 is a diagrammatic sketch of the invention as applied to a tube using distributed circuits, each extending in two directions from the tube electrodes so that the circuits are not terminated at the electrodes;

Fig. 3 is a sketch made partially diagrammatic to show clearly how the circuit arrangement of Fig. 2 may be applied to a practical tube structure; and Figs. 4 and 5 show the actual form of the type of tube indicated in Fig. 3 and the method of attaching the circuit.

Referring now to Fig. 1, the cathode, grid and plate of the triode vacuum tube 11 are indicated in coaxial arrangement at 1, 2, and 3 respectively. A coaxial line, inner conductor 4 and outer conductor 6, is connected to the cathode and grid and forms the input tuned circuit. A coaxial line, inner conductor 5 and outer conductor 7, is connected to the grid and plate and forms the output tuned circuit. It may be noted that these coaxial lines are essentially continuations of each other except for the interposition of the tube elements 1, 2, and 3 and the septum 10 by which the lines are electrically isolated from each other. The grid 2 is mounted in the conducting septum 10 which fits closely within the outer conductors 6 and 7 so that the grid 2 and the septum 10 together isolate and prevent interaction between the high frequency fields in the tuned input and output coaxial lines. It is important that this shielding between the input and output tuned circuits be very complete because there must be substantially no feedback between the input and output of the tube other than through the circuit external to the tube, which contains the filter to prevent feedback at undesired frequencies. The lengths of the two tuned lines 4, 6 and 5, 7 are determined by the conducting slidable disc members 8 and 9 respectively, which short-circuit the lines for high frequencies at any desired position. The representation of a standing wave of potential 17 which is a part of Fig. 1 indicates that the lines shown are three quarter wavelengths long at the desired operating frequency with an antinode of potential at the position of the tube electrodes. The lines may, however, be a greater odd number of quarter wavelengths long.

External input and output connections may be made to the inner conductors of the input and output tuned circuits as by the leads 12 and 13 which may be the inner conductors of coaxial lines as indicated. Lead 12 may connect with a high frequency source for the input and lead 13 may connect with any suitable load circuit in the usual manner. With an input from an external source through the lead 12 and with the feedback energy adjusted to be less than is required to make the circuit self-oscillate the device will function as a feedback amplifier with the amplification controllable through adjustment of the feedback energy. If the device is to be used simply as an oscillator, the feedback energy is made sufficient to cause the circuit to self-oscillate. The input from an external source and the input lead 12 are then, of course, unnecessary and not used. The leads 12 and 13 may be attached at various positions along the conductors 4 and 5 respectively, to suit the impedances or voltage requirements of the external input and load circuits.

The feedback circuit between the output and input tuned circuits comprises the leads 14 and 15 (which may be the inner conductors of coaxial lines as indicated) and the filter 16 interposed between the leads 14 and 15. The filter 16 may be of a known coaxial line type or any other type suitable for operation at the frequencies involved. It may be either high pass or band pass, the requirement being that it pass energy at the desired operating frequency while substantially blocking the passage of energy at other frequencies at which the circuit with feedback, but without the filter, would tend to oscillate. For instance, the circuit of Fig. 1, without the filter, would tend to oscillate at one-third of the desired frequency (under which condition the tuned circuit lines would be one-quarter wavelength long) and consequently the filter should be arranged to prevent feedback at that frequency while permitting feedback at the higher desired operating frequency. Ordinarily a regenerative feedback circuit will tend to regenerate at lower, rather than higher, frequencies so that usually it is necessary to prevent feedback at the lower undesired frequencies only, and then a high-pass type of filter is adequate. The amount of feedback energy may be adjusted by positioning the connections of leads 14 and 15 along the conductors 4 and 5. It is necessary, of course, to make the length of the line comprising leads 14 and 15 and the filter 16, such that the energy conducted therethrough from the output tuned circuit reaches the input tuned circuit in the proper phase to produce regeneration.

Thus Fig. 1 illustrates an embodiment of the invention in simple form. The device comprising distributed circuits which will support electrical waves of more than one frequency is constrained to operate only at the desired frequency by limiting the feedback to a path arranged so that it will not pass energy at undesired frequencies.

Fig. 2 illustrates diagrammatically an embodiment somewhat similar to that of Fig. 1 but preferable in that the tube electrodes are provided with two terminals and input and output tuning lines are attached to both terminals so that the electrodes are effectively at or near the centers of lines rather than at end terminations as in Fig. 1. An advantage of this is that the physical irregularities introduced into the lines by the electrode structures affect the electrical characteristics of the lines less when they are not located at the end terminations. In Fig. 2 the cathode, grid and plate of the triode 11 are designated 1, 2, and 3, respectively, as in Fig. 1 and other designations corresponding to those in Fig. 1 also indicate similar components. The input tuned circuit comprises the two coaxial lines 4, 6 and 24, 26 which are connected to opposite terminals of the cathode 1 and the grid 2, while the output tuned circuit comprises the coaxial lines 25, 27 and 5, 7 which are connected to opposite terminals of the grid 2 and the plate 3. The effective lengths of these lines are controlled by the slidable short-circuiting members 8, 28, 29 and 9 as by members 8 and 9 in Fig. 1. The representation of a standing wave of potential 17, which is a part of Fig. 2, indicates that the lines shown are three quarter wavelengths long, however, they may be a greater odd number of quarter wavelengths long. The input tuned lines 4, 6 and 24, 26 taken together make, in effect, a single continuous line with the cathode and grid near the center of its length and similarly the output tuned lines 25, 27 and 5, 7 together make, in effect, a single continuous line with the grid and plate near the center of its length. It is assumed that the grid 2 substantially isolates the high frequency fields within the lines so that the input and output circuits are substantially shielded from each other and self-oscillation cannot occur without an external feedback. An external feedback connection between the output and input tuned circuits is provided through the leads 14 and 15 and the filter 16 as explained in connection with the description of Fig. 1. Also as in Fig. 1 the output to a load circuit may be such as through lead 13, and in the case of operation as an amplifier connection to an external high frequency input source may be such as through the lead 12. The method of operation and the conditions for operation as either an amplifier or oscillator are explained in connection with the description of Fig. 1.

Figs. 1 and 2 being diagrams to illustrate the principle of the invention have (in order to maintain their simplicity) not included direct current power sources, insulating means and other details necessary in practical applications.

Figs. 3, 4 and 5 illustrate a practical application of the invention using a type of tube suitable for use at very high frequencies. Fig. 3 is partially diagrammatic to show clearly the connections to the tube. For this purpose the coaxial lines are shown arranged in line and the tube electrodes and terminals are shown similarly arranged and without mechanical details. Figs. 4 and 5 show the actual tube construction with the coaxial lines arranged at the corners of a quadrangle, and the tube electrodes and terminals arranged accordingly and with adequate shielding means. Similar designation numbers are used in Figs. 3, 4 and 5 so that by referring from one to the other of these three figures, the form of construction illustrated may be readily observed.

Referring now particularly to Fig. 3. The envelope enclosing the evacuated space of the tube 11 comprises the metallic plate 33 and flange 32 and the member 31 which may be of glass or any other suitable material. To the plate 33, which is grounded, are attached the outer conductors 6, 26, 7 and 27 of the coaxial lines used as tuned input and output circuits and also the grid 2 through the supporting shields 34 and 35. Each of the coaxial lines is attached to the plate 33 by means of a flange or eyelet 36 which is sealed to preserve the vacuum in the tube by a glass or quartz bead 37 or the like, through which passes the lead to the inner conductor of the line. The circuit of Fig. 3 is similar to that of Fig. 2. The cathode is heated by energy from source 38 while the plate circuit is energized from source 39. The lengths of the lines of the tuned input circuit are adjusted by means of the slidable short-circuiting members 28 and 8 and the lengths of the lines of the tuned output circuit are adjusted by means of the slidable short-circuiting members 9 and 29. The rods 52 are provided for adjusting these slidable members. Connection to an external load circuit may be through the lead 13 and connection to an external input circuit when the device is used as an amplifier may be through the lead 12. The external input and lead 12 are not required when the device is used as an oscillator. The feedback between the output and input tuned circuits is through leads 14 and 15 and the filter 16. Operation of the device is as was explained in connection with the description of Fig. 2.

Figs. 4 and 5 illustrate the construction of an actual tube of the type shown diagrammatically in Fig. 3. Wherever appropriate the designation numbers are the same as in previous figures. In the actual tube the four coaxial lines forming the input and output tuned circuits are arranged at the corners of a rectangle as shown most clearly in Fig. 5 rather than in line as shown in the diagram of Fig. 3. The helical grid 2 is attached to the horizontal metallic member 40 which is supported at its ends and connected to the grounded base plate 33 by two flanged members 41 and the shield plates 34 and 35 which extend nearly across the base plate at right angles to the members 41. The filamentary cathode 1 extends through apertures in the plates 34 and 35. The curved shielding members 42, 44 and 43, 45 connected to the base plate 33 and the shield plates 34 and 35 partially surround and shield the cathode lead-in conductors between the cathode and the eyelet apertures in the base plate.

The plate 3 is composed of two, generally triangular, portions joined together by flanges parallel to and above the grid structure. This plate structure is supported roof-like over the grid by the lead-in conductors 48 and 50 which make high frequency connection with the inner conductors 5 and 25 respectively, of the coaxial lines comprising the output tuned circuit. The plate 2 in the region of the flanged joint is shaped to provide a substantially semicircular electron receiving portion uniformly spaced from and parallel to the cathode and control grid. Two tapering metallic strips 46 are connected to the base plate and to the grid structure member 40. These strips conform to and are spaced from the under side of the plate structure.

The leading-in conductors 47 and 49 to the cathode, and 48 and 50 to the plate, are insulated for direct current from the inner coaxial line conductors 24, 4 and 5, 25 respectively, by insulating sleeves such as 51 which, however, provide low impedance capacitive paths for high frequency current between the inner conductors of the lines and the cathode and plate which are in effect continuations of those conductors as indicated in Figs. 2 and 3. Also, the members 42, 44, 43, 45 and 46 are effectively continuations (through the tube) of the outer conductors of the coaxial lines.

These members 42, 44, 43, 45 and 46, together with the base plate 33, the plates 34 and 35 and the grid 2, thoroughly isolate the input and output portions of the tube so that there is substantially no internal feedback to produce self-oscillation or regeneration. In order to produce regenerative amplification or self-oscillation at a desired frequency, according to the invention, an external feedback path is provided by the leads 14 and 15 with the filter 16 interposed between, the filter being designed to pass energy at the desired frequency while preventing substantial passage of energy at other frequencies at which the system with the filter absent would tend to regenerate or oscillate.

Although specific embodiments of the invention have been shown and described, it will be appreciated that they are but illustrative and that various modifications may be made therein without departing from the scope and spirit of this invention as defined in the appended claims.

What is claimed is:

1. A high frequency device arranged to operate at a given high frequency comprising an electron tube with input and output circuits having distributed inductance and capacitance extending in electrical length over a plural odd number of quarter wavelengths at the said operating frequency, the said circuits being tuned in accord with the said operating frequency whereby harmonically related modes of oscillation including one at said operating frequency and one at a lower frequency are determined, an electrode within the tube which in cooperation with the input and output circuit structures provides substantially complete shielding between the input and output circuits and prevents substantial direct transfer of energy therebetween, a regenerative feedback circuit external to the tube arranged to transfer energy from the output circuit to the input circuit and means comprising a high-pass filter connected in said regenerative feedback circuit to prevent substantial transfer of energy at frequencies lower than said operating frequency whereby the device is prevented from operating regeneratively at said lower frequency and allowed to operate regeneratively at said operating frequency as determined by the said tuning of the input and output circuits.

2. A high frequency device arranged to operate at a given high frequency comprising an electron tube having a cathode, a control grid and an anode, a high frequency circuit connected to the cathode and the control grid, a high frequency circuit connected to the anode and the control grid, each of the said high frequency circuits having distributed inductance and capacitance extending a plural odd number of quarter wavelengths at said operating frequency and being tuned in accord with said operating frequency whereby harmonically related modes of oscillation including one at said operating frequency and one at a lower frequency are determined, a regenerative energy feedback connection external to the tube between the two said high frequency circuits, and means associated with the feedback circuit to prevent substantial feedback of energy at the said lower frequency.

3. A high frequency device comprising an electron tube having a cathode, a control grid and an anode, a tuned input circuit connected to the cathode and control grid, said input circuit comprising two tuned coaxial line circuits, one connected to the cathode and control grid through one pair of terminals thereof and one connected to the cathode and control grid through a second pair of terminals thereof whereby the cathode and control grid and the two line circuits connected thereto form a substantially continuous high frequency input line circuit with the cathode and control grid at a mid-point, a tuned output circuit connected to the anode and control grid, said output circuit comprising two tuned coaxial line circuits, one connected to the anode and the control grid through one pair of terminals thereof and one connected to the anode and control grid through a second pair of terminals thereof whereby the anode and the control grid and the two lines connected thereto form a substantially continuous high frequency output line circuit with the anode and control grid at a mid-point, a regenerative feedback circuit external to the electron tube for transferring high frequency energy from the said output line circuit to the said input line circuit and means associated with the said feedback circuit to substantially prevent the transfer therethrough of energy at frequencies lower than a desired operating frequency.

4. A regenerative electronic device comprising an electron tube having an evacuated envelope and having distributed input and output tuned circuits which include elements and leads within the tube envelope and extend partly within and partly without the tube envelope over a plural odd number of quarter wavelengths at a given operating frequency, a portion within the tube envelope extending over substantially or in excess of one of said quarter wavelengths, the tuning of said circuits determining harmonically related modes of oscillation including one at said operating frequency and one at a lower frequency and regenerative means connecting the said input and output circuits wholly external to the tube envelope for causing regeneration at said operating frequency and inhibiting regeneration at said lower frequency.

5. A high frequency oscillator for producing oscillations of a given frequency comprising an electron tube with input and output circuits having distributed inductance and capacitance extending over a plural odd number of quarter wavelengths at the said given frequency and being tuned in accord with said given frequency whereby harmonically related modes of oscillation including one at said given frequency and one at a lower frequency are determined, means for substantially shielding the input and output circuits from each other whereby direct transfer of energy therebetween is substantially prevented, a regenerative feedback circuit external to the tube for transferring input excitation energy from the output circuit to the input circuit and frequency discriminating means including in the said feedback circuit for substantially preventing the transfer of excitation energy to the input circuit at the said lower frequency.

6. A high frequency amplifier for amplifying high frequency energy of a given frequency comprising an electron tube with input and output circuits having distributed inductance and capacitance extending over a plural odd number of quarter wavelengths at the said given frequency and being tuned in accord with said given frequency whereby harmonically related modes of oscillation including one at said given frequency and one at a lower frequency are determined, means for substantially shielding the input and output circuits from each other whereby direct transfer of energy therebetween is substantially prevented, a regenerative feedback circuit external to the tube for transferring input excitation energy from the output circuit to the input circuit and frequency discriminating means included in the said feedback circuit for substantialy preventing the transfer of excitation energy to the input circuit at the said lower frequency.

SYDNEY B. INGRAM.

REFERENCES CITED

The following references are of record in the file of this patent:

UNITED STATES PATENTS

| Number | Name | Date |
|---|---|---|
| 2,153,728 | Southworth | Apr. 11, 1939 |
| 2,173,427 | Scott | Sept. 19, 1939 |
| 2,253,589 | Southworth | Aug. 26, 1941 |
| 2,280,824 | Hansen | Apr. 28, 1942 |
| 2,284,405 | McArthur | May 26, 1942 |
| 2,287,845 | Varian | June 30, 1942 |

FOREIGN PATENTS

| Number | Country | Date |
|---|---|---|
| 494,324 | Great Britain | 1938 |